United States Patent
Aihara

(10) Patent No.: US 8,103,846 B2
(45) Date of Patent: Jan. 24, 2012

(54) MEMORY MANAGEMENT UNIT, IMAGE FORMING APPARATUS, MEMORY MANAGEMENT METHOD, AND COMPUTER PROGRAM

(75) Inventor: Takashi Aihara, Soka (JP)

(73) Assignee: Ricoh Company, Ltd., Tokyo (JP)

( * ) Notice: Subject to any disclaimer, the term of this patent is extended or adjusted under 35 U.S.C. 154(b) by 416 days.

(21) Appl. No.: 12/488,835

(22) Filed: Jun. 22, 2009

(65) Prior Publication Data

US 2009/0319734 A1 Dec. 24, 2009

(30) Foreign Application Priority Data

Jun. 23, 2008 (JP) ................................. 2008-163547

(51) Int. Cl.
*G06F 12/00* (2006.01)
*G06F 12/02* (2006.01)
*G06F 12/16* (2006.01)

(52) U.S. Cl. ......................... 711/163; 711/161; 711/173

(58) Field of Classification Search ................... 711/161, 711/163, 173
See application file for complete search history.

(56) References Cited

U.S. PATENT DOCUMENTS

| 5,802,493 A * | 9/1998 | Sheflott et al. ................ 705/1.1 |
| 2007/0253679 A1* | 11/2007 | Tanaka et al. ................. 386/95 |

FOREIGN PATENT DOCUMENTS

| JP | 2002-318732 | 10/2002 |
| JP | 2005-25515 | 1/2005 |

* cited by examiner

*Primary Examiner* — Yong Choe
(74) *Attorney, Agent, or Firm* — Oblon, Spivak, McClelland, Maier & Neustadt, L.L.P.

(57) ABSTRACT

A memory management unit for an information processing system includes a controller and a non-volatile memory. The controller controls data writing process. The non-volatile memory, used for storing non-rewritable and rewritable data, is partitioned into a read-only partition to store the non-rewritable data, and a rewritable partition to store the rewritable data including apparatus-specific data including access-restricted data required for activating the information processing system. The access-restricted data is prohibited from being written during normal usage but writable at specific times. The non-rewritable data, stored in the read-only partition, is protected from an abrupt power shutdown occurring when a data writing process is conducted to the rewritable data. The controller stores the access-restricted data to the read-only partition by changing an attribute of the read-only partition of the non-volatile memory from a read-only attribute to a rewritable attribute.

9 Claims, 10 Drawing Sheets

FIG. 9
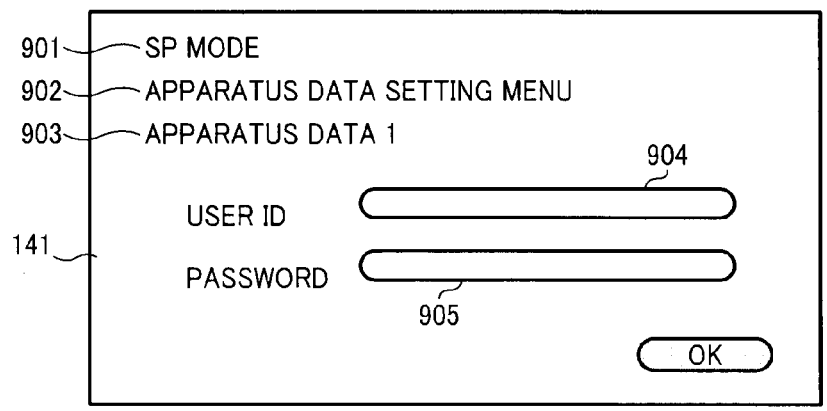
FIG. 10
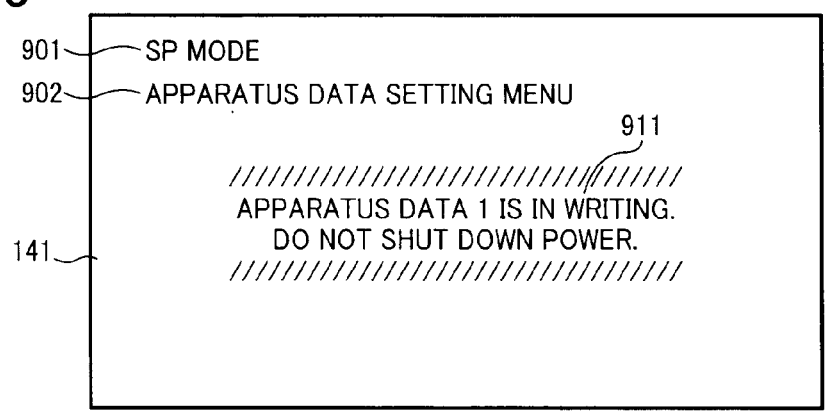
FIG. 11
| DATE | USER | UPDATED DATA | RESULT |
|---|---|---|---|
| 2008/02/01 13:00 | ID xxxxxx | D100 xxxxxxxxxxxxxxxxx | OK |
| 2008/02/03 13:00 | ID xxxxxx | D100 xxxxxxxxxxxxxxxxx | OK |
| 2008/02/05 13:00 | ID xxxxxx | D100 xxxxxxxxxxxxxxxxx | NG |

MEMORY MANAGEMENT UNIT, IMAGE FORMING APPARATUS, MEMORY MANAGEMENT METHOD, AND COMPUTER PROGRAM

CROSS-REFERENCE TO RELATED APPLICATIONS

This application claims priority to Japanese Patent Application No. 2008-163547, filed on Jun. 23, 2008 in the Japan Patent Office, the entire contents of which are hereby incorporated by reference herein.

BACKGROUND OF THE INVENTION

1. Field of the Invention

The present invention relates to a memory management unit having a non-volatile memory for storing both rewritable and non-rewritable data such as program data that the memory management unit manages using a file system, an image forming apparatus including the memory management unit, a memory management method performed by the memory management unit, and a computer program comprised of program code that, when read by the memory management unit, executes the memory management method in the image forming apparatus.

2. Description of the Background Art

In general, non-volatile memory media such as a hard disk drive (HDD), a flash read-only memory (flash ROM), or the like used in a computer system can retain or store data even when power is not supplied to the non-volatile memory media (i.e., power OFF condition). However, if power supply to the non-volatile memory media is shut down while data is being written to the media, the data may be corrupted. If such data is being used as management information for a file system, access to certain files or directories may become impossible. Further, if a directory is corrupted, access to other files may also become impossible.

JP-2002-318732-A and JP-2005-025515-A describe methods for coping with such abrupt power shutdowns.

JP-2002-318732-A discusses a method of detecting data error and carrying out automatic data recovery after a power shutdown or a temporary blackout. Such method can, for example, reduce an inspection time after power supply is reintroduced, enhance data error inspection accuracy, and devise automatic data recovery. Such processes may be conducted as described in detail below.

When a file stored in a file storage device is accessed for data writing purposes, a file control unit adds access time data as counted by a counter to the information in the file when data is being written to the file; a memory unit stores the file information; a power shutdown processing unit stores blackout time data, detected by a power shutdown detector, to the memory unit; when power supply resumes after shutdown, which may be determined by a power shutdown determination unit, a file inspection unit inspects the file, which may be accessed for data writing right before or after the blackout time using the blackout time data, and conducts error detection; a file recovery unit recovers the file detected as having error using the file information stored in the memory unit.

The invention described in JP-2002-318732-A is concerned with issues of cost increase and extended recovery time, in which a power shutdown detection circuit for detecting power shutdown may be used with a search unit used for searching for corrupted files. For example, in JP-2002-318732-A, a time required for file recovery can be shortened by managing a file access time and power shutdown time.

However, because time data is written to the non-volatile memory whenever a file is accessed, access speed declines. Further, a plurality of non-volatile memories is required to secure storage of access time data to the non-volatile memory when a power supply is shut down, which increases the cost.

JP-2005-025515-A discusses a method of recovering image data automatically even if the power supply is abruptly shut down.

Specifically, JP-2005-025515-A discusses an image forming apparatus that can recover image data automatically even if the power supply is abruptly shut down without setting a mode or conducting an image data inputting process after power supply is resumed. Further, the image forming apparatus can conduct such automatic recovery process without adding new hardware. The image forming apparatus includes a non-volatile memory to store mode setting and image data used for image forming operation. The image forming apparatus reads out data in the non-volatile memory and outputs image data corresponding to the mode setting again after power supply is resumed.

In such image forming apparatus, image data information, which may be used as management information for image data, and process-related information, which is required for conducting certain processes, is stored in the non-volatile memory when a normal processing operation is completed.

Then, when the power supply is shut down before completing a given intermediate process or an image output process and the power supply is resumed, it is determined whether image data processing, managed by the image data information, is to be conducted based on the process-related information stored in the non-volatile memory.

In JP-2005-025515-A, data stored in the non-volatile memory when power supply is shut down can be protected by duplicating the data. However, such method requires more memory, which increases the cost. Further, in JP-2005-025515-A, although a recovery function of file management table for file system can be enhanced, corrupted data may not be recovered completely if the data is heavily corrupted.

As for a MFP (multi functional peripheral)-type image forming apparatus, a controller may need to retain or store certain types of data even when power is not supplied to the MFP (i.e., power source OFF), and the type of data which needs to be retained in the non-volatile memory may vary depending on the type of application. For example, such data may be program data, apparatus-specific data, user data, or stored image data. The data may be classified based on certain specifications such as data-writing frequency, data size, data importance, data read/write speed, and detachability. Although a plurality of memory media such as HDD, flash ROM, NVRAM can be used based on classification of data, if data is stored in such memory media without regard to data type and memory type, a cost increase may occur.

As for HDD, flash ROM (e.g., NAND flash), and the like, memory cost per bit decreases significantly and large-capacity memories can be manufactured with reduced cost because of advancements in semiconductor fine processing techniques. However, memory cost per bit for NVRAM remains high because of the material used, which is different from that for HDD or flash ROM. Further, user data, which may be stored in a controller board, is one type of data that has higher importance. Because a user may need to use such user data if a controller board has failed or malfunctioned, such user data may need to be stored in a removable memory.

In view of such requirements for each type of data, the MFP may use a detachable NVRAM having small memory capacity to store data such as small-size data that needs to be transferred at a given situation, and may use NAND flash ROM or HDD having larger memory capacity to store data having larger volume such as program data, stored image data, and security data that is not suitable for a removable memory. The NAND flash ROM or HDD may be disposed on a controller board.

Further, a controller may need apparatus-specific data in addition to system program data to start up a computer system, wherein such apparatus-specific data may include authentication data for software and apparatus configuration. Such data required for system start-up, other than program data, may require data writing access control, which is different from installing upgraded program data for given software. Accordingly, such data may need to be stored in a read/writeable partition, which is different from program data, for example.

However, such read/writeable partition may include other various types of data, which may need to be written at a given timing. If a power shutdown occurs during a data writing process for given data, data required for system activation or start-up stored in the same partition may be affected by such power shutdown, by which file corruption may occur, which is not desirable for operating a computer system.

SUMMARY

In one aspect of the present invention, a memory management unit for an information processing system includes a controller and a non-volatile memory. The controller controls data writing to the non-volatile memory. The non-volatile memory is used for storing both non-rewritable data and rewritable data required to be read and written at a given timing. The non-volatile memory is managed by a file system and is partitioned into a plurality of partitions including a read-only partition and a rewritable partition. The read-only partition stores the non-rewritable data including program data to be used when activating the information processing system. The rewritable partition stores the rewritable data including apparatus-specific data. The apparatus-specific data further includes access-restricted data required for activating the information processing system. The access-restricted data is prohibited from being written during normal usage operation but is writable at specific times. The non-rewritable data, stored in the read-only partition, is protected from an abrupt power shutdown occurring when the rewritable data is being written. The controller stores the access-restricted data to the read-only partition by changing an attribute of the read-only partition of the non-volatile memory from a read-only attribute to a rewritable attribute.

In another aspect of the present invention, a memory management method for an information processing system is provided that protects data from the effects of an abrupt power shutdown occurring while data is being written. The information processing system includes a controller that controls writing of data to a non-volatile memory of the information processing system. The non-volatile memory stores both non-rewritable data and rewritable data required to be read and written at a given timing. The non-volatile memory is managed by a file system and is partitioned into a plurality of partitions including a read-only partition and a rewritable partition. The read-only partition stores the non-rewritable data including program data to be used when activating the information processing system, and the rewritable partition stores the rewritable data including apparatus-specific data. The apparatus-specific data further includes access-restricted data required for activating the information processing system. The access-restricted data is prohibited from being written during normal usage and is writable only at a given timing. The non-rewritable data, stored in the read-only partition, is protected from the effects of an abrupt power shutdown occurring when the rewritable data is being written. The method comprises a first switching step, a storing step, and a second switching step. The first switching step switches an attribute of the read-only partition of the non-volatile memory from a read-only attribute to a rewritable attribute temporarily. The storing step stores the access-restricted data to the read-only partition conditioned to the rewritable attribute. The second switching step switches an attribute of the read-only partition of the non-volatile memory from the rewritable attribute to the read-only attribute.

In another aspect of the present invention, there is provided a computer program, including computer-readable instructions that, when executed by a computer, instruct a controller to execute a method of protecting data from an abrupt power shutdown occurring while data is being written in an information processing system. The information processing system includes the controller, which controls the writing of data for the information processing system, and a non-volatile memory that stores both non-rewritable data and rewritable data required to be read and written at a given timing. The non-volatile memory is managed by a file system and is partitioned into a plurality of partitions including a read-only partition and a rewritable partition. The read-only partition stores the non-rewritable data including program data to be used when activating the information processing system, and the rewritable partition stores the rewritable data including apparatus-specific data. The apparatus-specific data further includes access-restricted data required for activating the information processing system. The access-restricted data is prohibited from being written during normal usage and is writable only at a given timing. The non-rewritable data, stored in the read-only partition, is protected from the abrupt power shutdown occurring when the rewritable data is being written. The method comprises a first switching step, a storing step, and a second switching step. The first switching step switches an attribute of the read-only partition of the non-volatile memory from a read-only attribute to a rewritable attribute temporarily. The storing step stores the access-restricted data to the read-only partition conditioned to the rewritable attribute. The second switching step switches an attribute of the read-only partition of the non-volatile memory from the rewritable attribute to the read-only attribute.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a flowchart showing a process of rewriting data by setting a switching device on a control board to ON;

FIG. 9 shows an example screen of an operation unit used for inputting identification data;

FIG. 10 shows an example screen of an operation unit a displaying a warning message of "not to shutdown power"; and FIG. 11 shows an example format of updated history data displayed on an operation unit.

Figure 1:
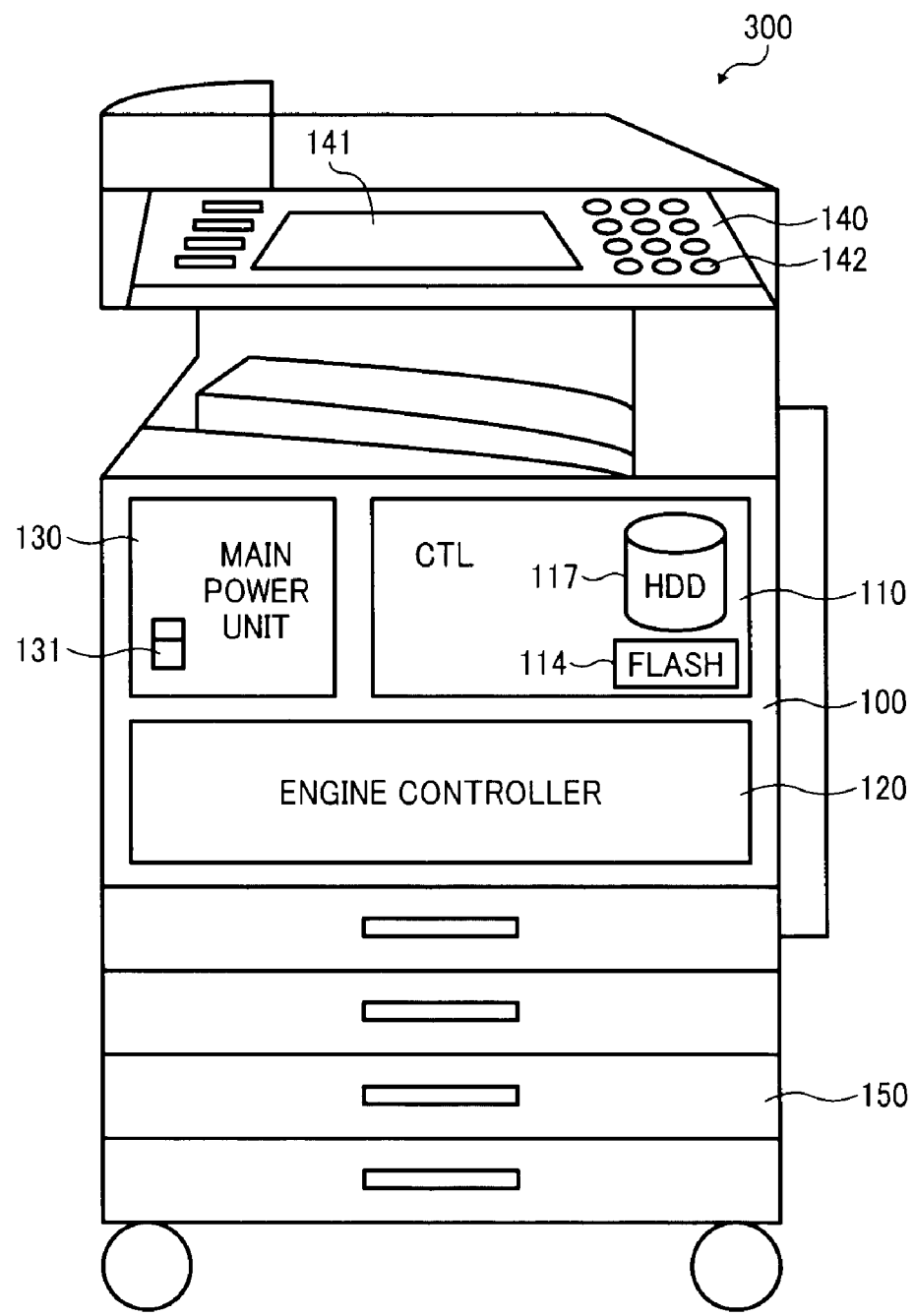
FIG. 1 illustrates a schematic configuration of an image forming apparatus according to an exemplary embodiment.

The accompanying drawings are intended to depict example embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXAMPLE EMBODIMENTS

A description is now given of example embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the drawings, an information processing system or apparatus an exemplary embodiment is described, wherein the information processing system may be an image forming apparatus, for example. The image forming apparatus may employ electrophotography, for example, and may be used as a copier, a printer, a facsimile, or a multi-functional imaging apparatus which may include copy and facsimile function, but not limited thereto.

FIG. 1 illustrates a schematic configuration of an image forming apparatus 300 according to an exemplary embodiment. The image forming apparatus 300 may be a digitally-controlled multi-functional image processing apparatus (or multi function peripheral), which may include copier function, printing function, and facsimile function, for example.

As shown in FIG. 1, the image forming apparatus 300 may include an image forming unit 100 at its center portion, for example. The image forming unit 100 may include a main controller 110 (CTL 110), an engine controller 120, and a main power source 130, for example. The image forming apparatus 300 may further include an operation unit 140 at its upper portion, and a sheet feed unit at its lower portion, for example.

The main controller 110 may include a storage device, such as a hard disk drive 117 (HDD 117) and a flash read-only memory 114 (flash ROM 114), which are examples of non-volatile memory. Based on information stored in the storage device, the main controller 110 executes given control operations. The main power source 130 supplies power to each unit in the image forming apparatus 300. When a main switch 131 is set to ON, power is supplied from an external power source to the main power source 130, and then main power source 130 supplies power to the each unit in the image forming apparatus 300. Further, the operation unit 140 may include an operation panel 141, and a hard key 142 used for inputting information. In the present invention, the main controller 110 may be used as a memory management unit.

Figure 2:
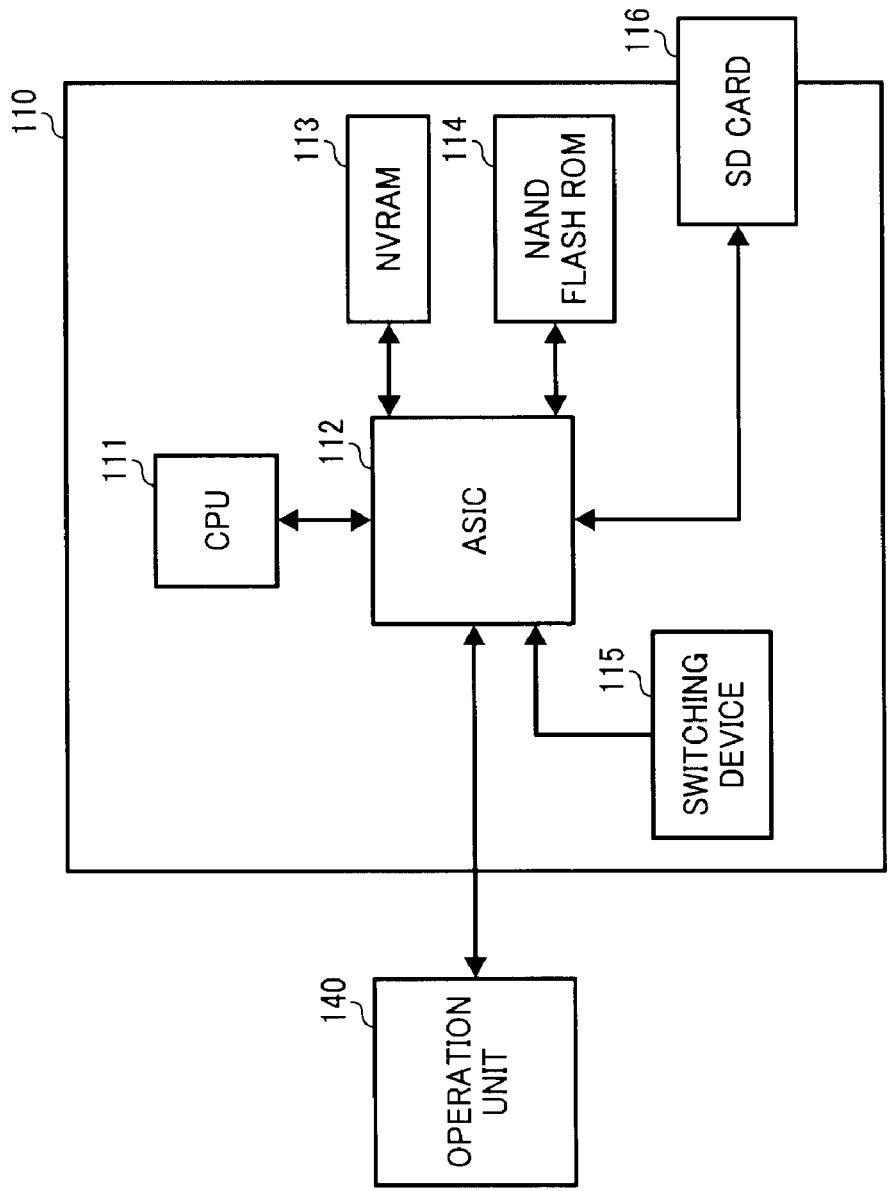
FIG. 2 shows a block diagram of a main controller.

FIG. 2 shows a block diagram of the main controller 110. The main controller 110 may include a central processing unit 111 (CPU 111), an application specific integrated circuit 112 (ASIC 112), a non-volatile random access memory 113 (NVRAM 113), and the flash read-only memory 114 (flash ROM 114), a data-writing switching device 115 (hereinafter "switching device 115"), and a card interface (I/F), for example. The main controller 110 may be interfaced to a card memory such as a SD card 116 via the card interface. Further, the operation unit 140 may be connected to the ASIC 112, in which the operation unit 140 inputs information to the ASIC 112, and the ASIC 112 transmits signals to the operation unit 140 to display information on the operation panel 141.

The CPU 111 may control the image forming apparatus 300 as a whole. Under a control of the CPU 111, the ASIC 112 may control image processing operation, data storing devices such as the non-volatile memory, and the operation unit 140. Further, the CPU 111 and ASIC 112 may be used to store data as described later.

Figure 3:
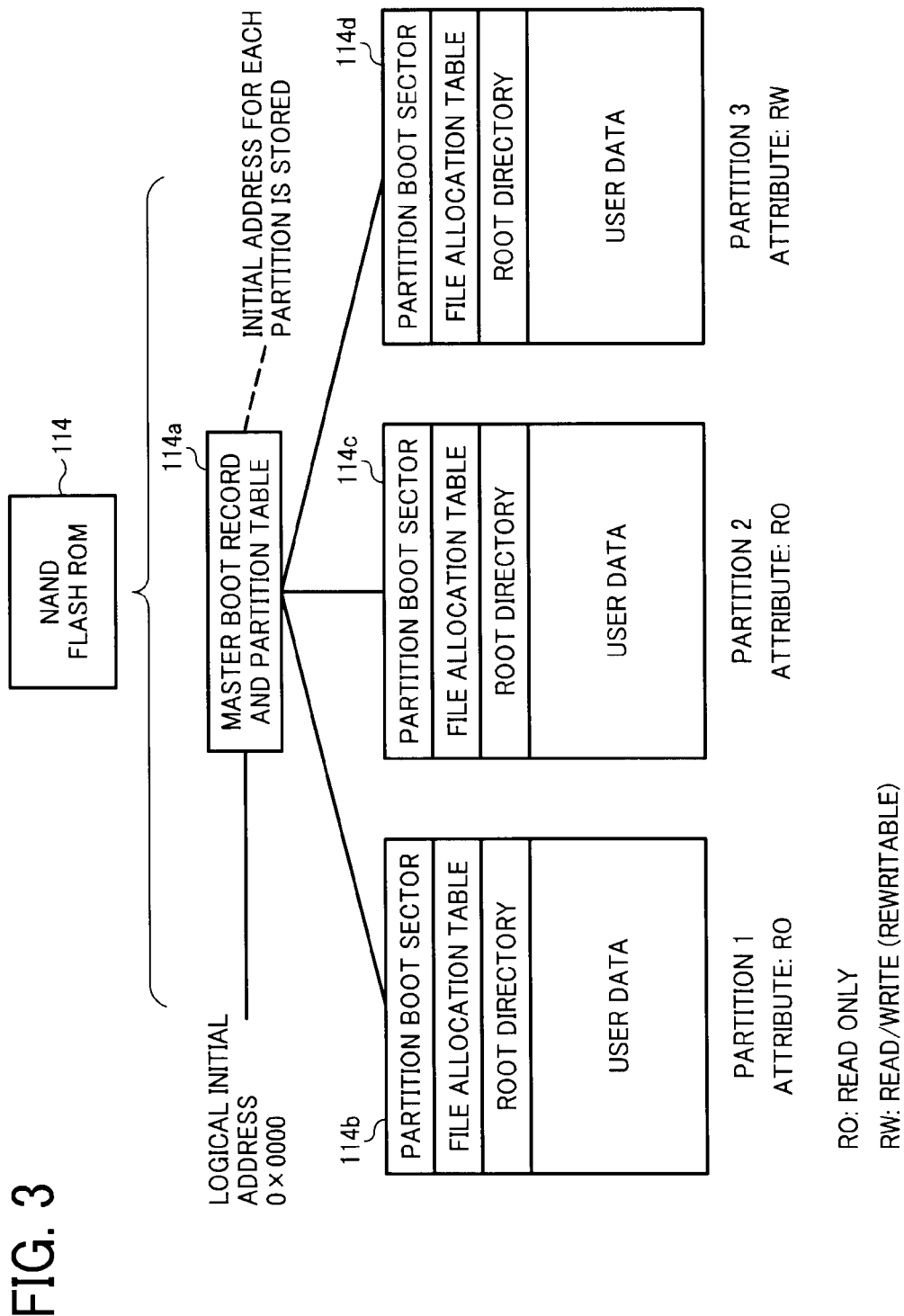
FIG. 3 shows a layout of file system of flash read-only memory.

FIG. 3 shows a layout of file system of the flash ROM 114. Typically, one storage medium such as HDD 117 or flash ROM 114 may be partitioned into a plurality of partitions, and data may be managed using a file on a file system. Each of the partitions may be used as a rewritable (RW) field, which can read/write data, and a read-only (RO) field, which can only read data. Such RW or RO partitions may be set depending on type of data.

As shown in FIG. 3, the flash ROM 114 may be partitioned into three partitions 114b, 114c and 114d, and the first and second partitions 114b and 114c may be used as read-only (RO) field, and the third partition 114c may be used as rewritable (RW) field, which can read/write data. The three partitions 114b, 114c and 114d may be managed using a master boot record and partition table 114a. The master boot record and partition table 114a may store an initial address for each of the three partitions 114b, 114c, and 114d.

Figure 4:
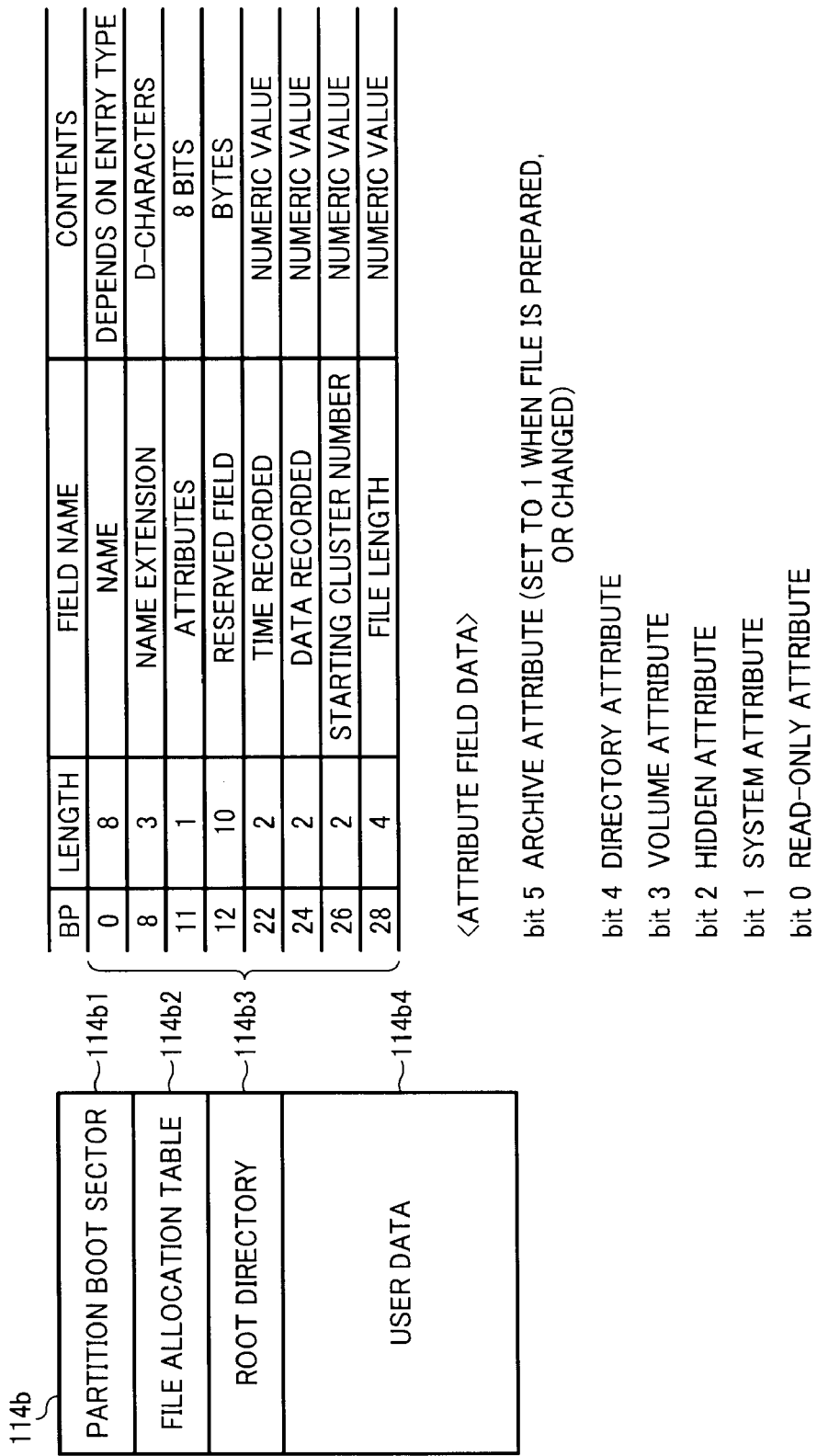
FIG. 4 shows fields and root directory set for one partition.

As shown in FIG. 4, each of the three partitions 114b, 114c, and 114d may be assigned with given fields and functions. FIG. 4 shows an area and a root directory set for the first partitions 114b having given field names. Other partitions 114c and 114d may have similar configuration.

Specifically, as shown in FIG. 4, when a value of attribute field "bit 0" of a root directory entry 114b3 is changed from "0" to "1," RO (read-only) attribute is set, by which data-writing cannot be conducted on an OS (operating system), wherein the root directory entry 114b3 may be used as file system management field for partition.

As shown in FIG. 4, the first partition 114b may include a partition boot sector 114b1, a file allocation table 114b2, a root directory 114b3, and a user data 114b4, for example. The root directory 114b3 may be configured with "BP," "Length," "Field Name," and "Contents," for example. The Attribute Field data, which is one configuration of the root directory 114b3, may include following attributes; bit 5: archive attribute (set to 1 when file is prepared or changed); bit 4: directory attribute; bit 3: volume attribute; bit 2: hidden attribute; bit 1: system attribute; bit 0: read-only attribute.

Further, in an exemplary embodiment, a plurality of root directory entries included in one partition are set with a same attribute, and the attribute of the partition is managed on the OS.

Figure 5A:
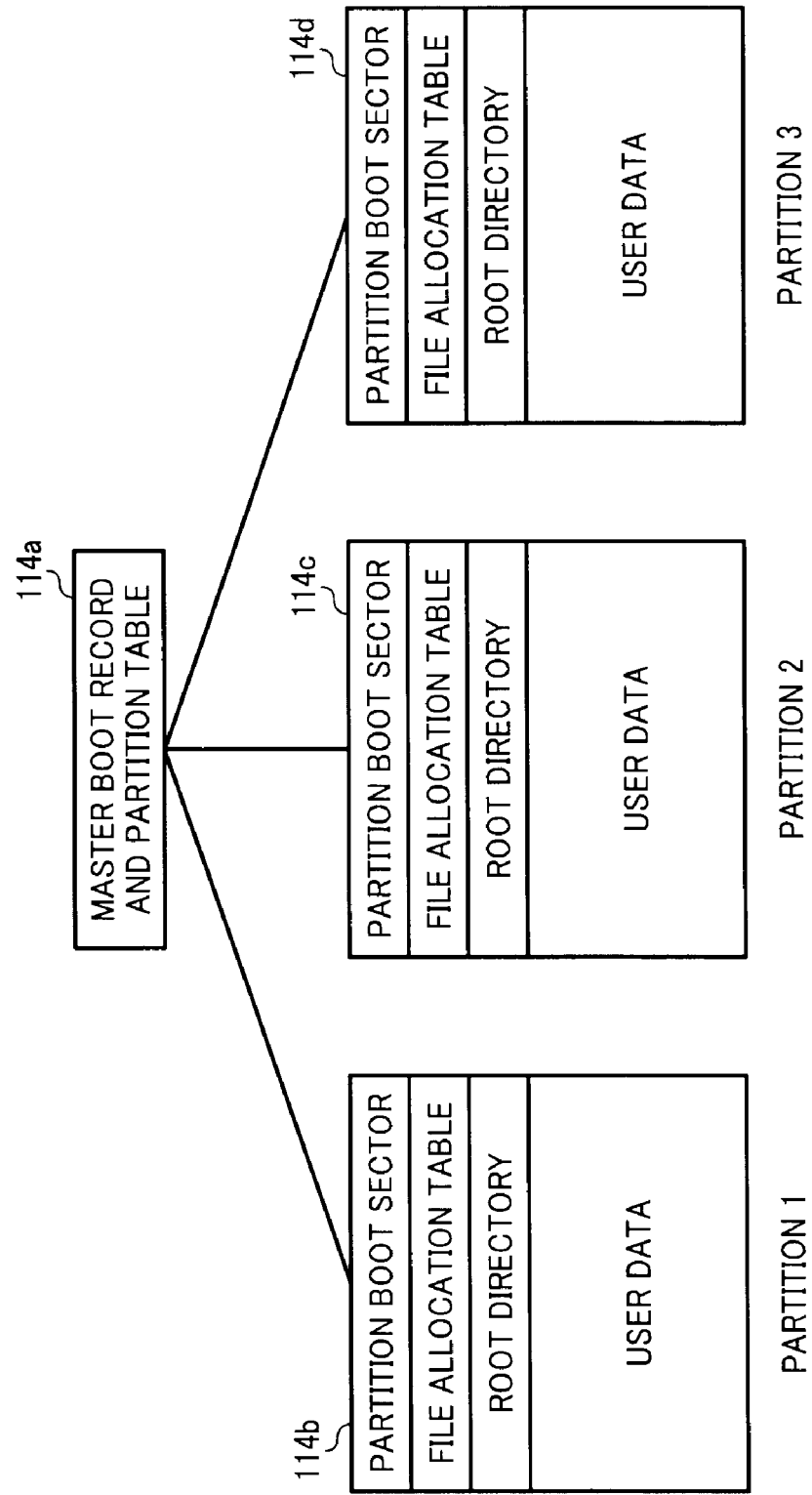
FIGS. 5A and 5B show data arrangement in a NAND flash read-only memory used for the image forming apparatus of FIG. 1.
Figure 5B:
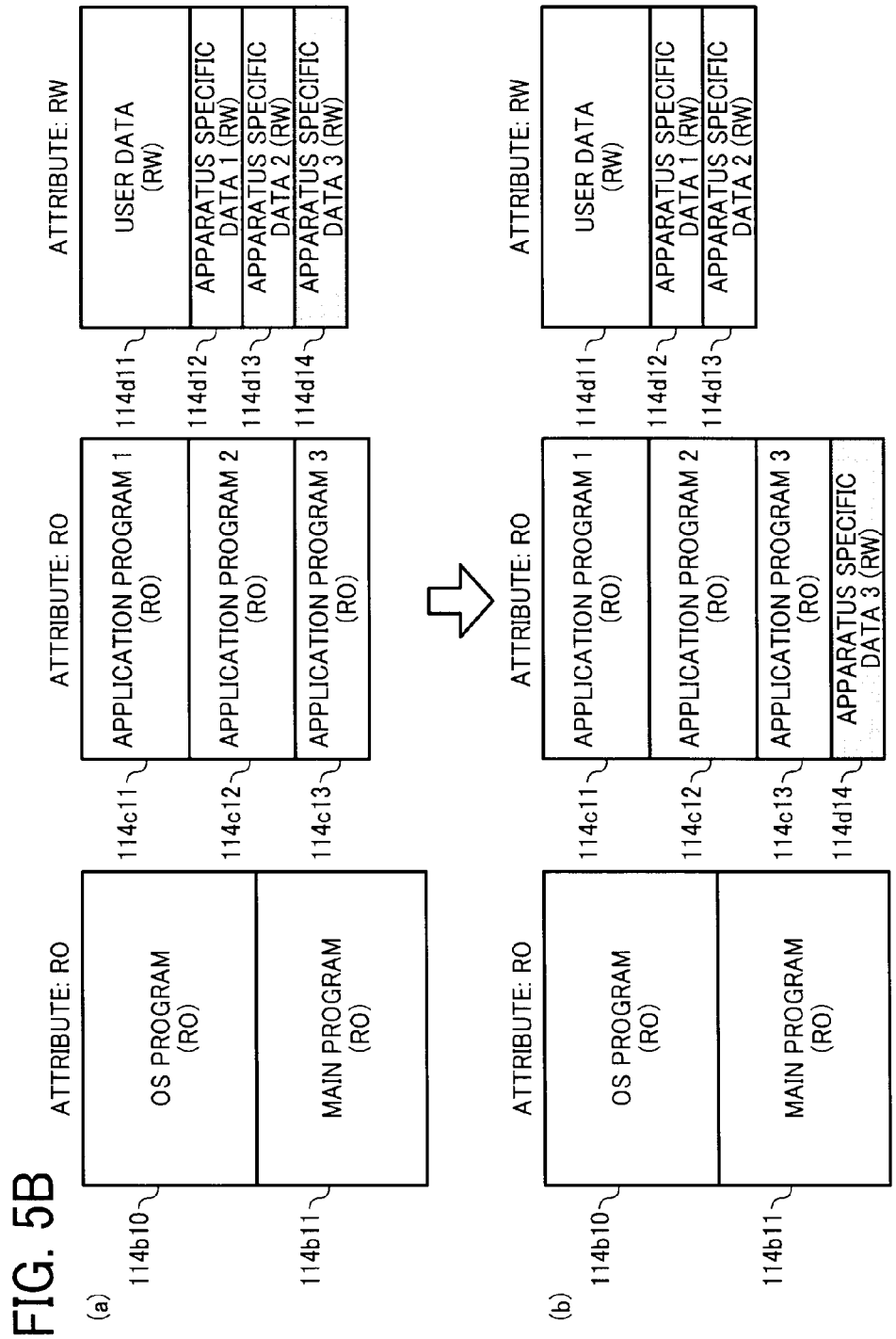

FIGS. 5A and 5B show data arrangement in a NAND flash ROM used in the image processing apparatus 300. In the image processing apparatus 300, as shown in FIG. 5B, program data may be stored in the RO (read-only) partitions 114b and 114c, and user data and apparatus-specific data may be stored in the RW (rewriteable) partition 114d based on types of data.

As shown in FIG. 5B(a), an OS (operating system) program 114b10 and a main program 114b11 may be stored in read-only field of the first partition 114b; first to third application programs 1 to 3 (114c11, 114c12, 114c13) may be stored in read-only field of the second partition 114c, to which data-writing cannot be conducted.

On one hand, as show in FIG. 5B(a), user data 114d11 and first to third apparatus-specific data (114d12, 114d13, 114d14: apparatus-specific data 1, 2, 3 in FIG. 5B(a)) may be stored in rewritable field of the third partition 114d, wherein such data is stored in the rewritable field, by which such data is read/writeable. In the following description and drawings, apparatus-specific data may be referred as apparatus data.

When a power shutdown occurs during a data writing process to a non-volatile memory, such power shutdown affects a partition that is under a data writing process. If a power shutdown occurs during a data writing process of user data, an access to apparatus-specific data included in the same partition may be affected by a corruption of file allocation table (FAT), for example. The apparatus-specific data may include a plurality of data, and may include the third apparatus-specific data 114d14 shown in FIG. 5B(a) used as an essential or indispensable data to activate or start-up a system, for example. The third apparatus-specific data 114d14 may be referred to as access-restricted data. If such essential data in the third apparatus-specific data 114d14 is corrupted, the system cannot be started-up, by which data recovery or debug could not be conducted, and may result into replacement of a control board, at worst.

In view of such inconvenience, in an exemplary embodiment, the third apparatus-specific data 114d14 required for the system start-up can be stored in the second partition 114c, which has read-only attribute as shown in FIG. 5B(b), and a partition attribute is managed.

Data-writing to the read-only partition can be conducted by enabling data-writing to the read-only partition. Specifically, the switching device 115, which may be called dipswitch DIPSW1, is set to ON when to write data to the read-only partition of the non-volatile memory. The switching device 115 may be disposed on the main controller 110, and used to switch a given partition of the non-volatile memory from read-only partition to rewritable partition or vice verse.

Figure 6:
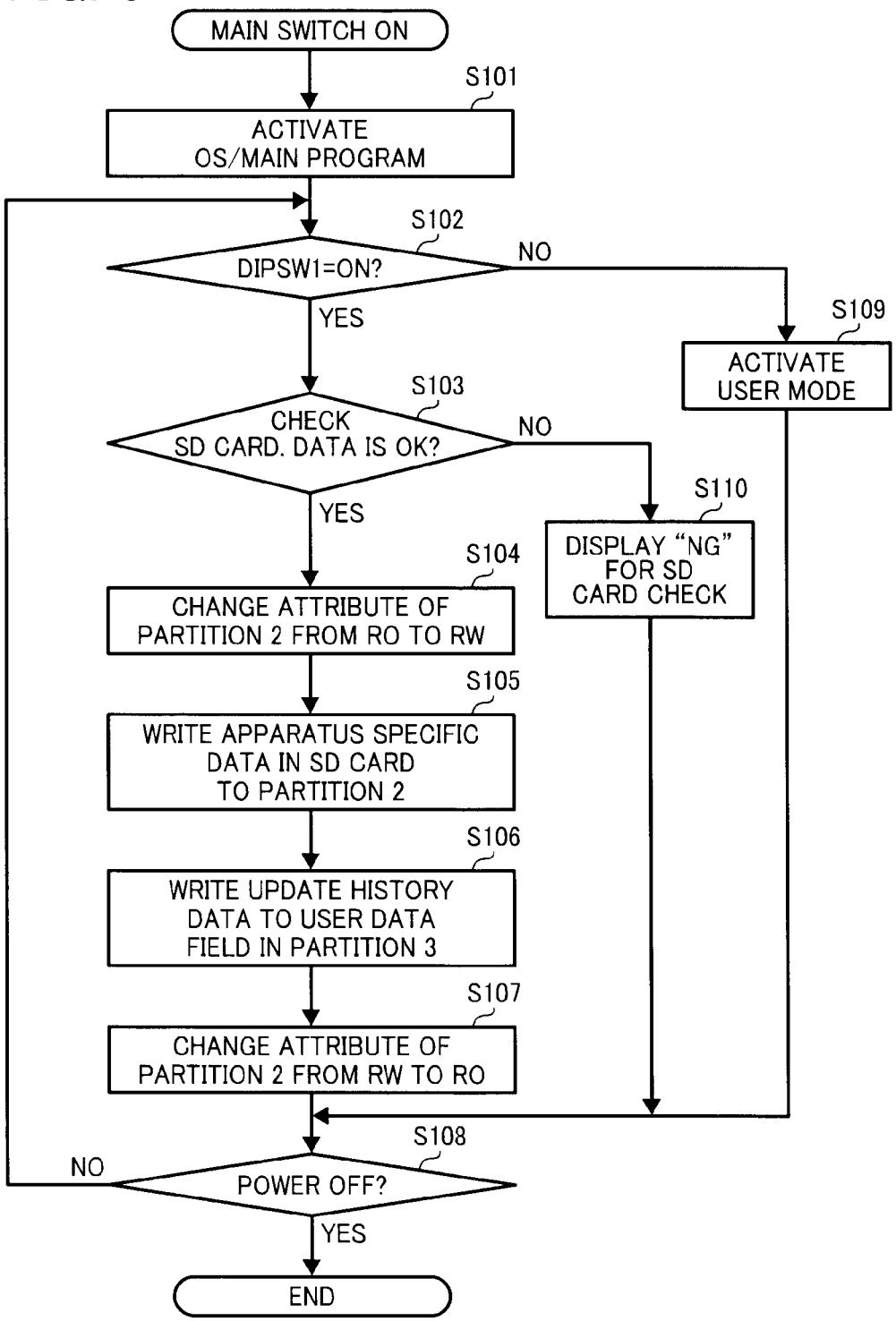

FIG. 6 is a flowchart showing a process of writing or rewriting apparatus-specific data, which may be conducted by the ASIC 112 under a command of the CPU 111. The CPU 111 executes the writing or rewriting process using a given program, stored in a read-only memory (ROM), at a working area in a random access memory (RAM). As such, the CPU 111 and ASIC 112 can be used to write and store data, and the CPU 111 and ASIC 112, alone or in combination, may be used as a controller.

In FIG. 6, at step S101, a power source is set to ON, and a main program is activated or started-up.

At step S102, an operation status of the switching device 115 (or dipswitch DIPSW1) is checked by using given software. If the switching device 115 is set to ON (step S102: Yes), the SD card 116 is checked at step S103.

At step S103, it is checked whether data stored in the SD card 116 corresponds to data of the third apparatus-specific data 114d14 used as access-restricted data. As such, the apparatus-specific data may be written using data in the SD card 116, which is different from a normal start-up of system. As above described, a process of using the SD card 116 may be conducted by setting the switching device 115 to ON.

If it is checked that data stored in the SD card 116 corresponds to data of the third apparatus-specific data 114d14 (step S103: Yes), an attribute of the second partition 114c is changed from RO (read-only) to RW (rewritable) at step S104. By changing the attribute of the second partition 114c to RW (rewritable) condition, an attribute of root directory entry of the third apparatus-specific data 114d14 can be changed from RO (read-only) to RW (rewritable).

At step S105, data in the SD card 116 is written to the second partition 114c because data in the SD card 116 corresponds to the third apparatus-specific data 114d14.

At step S106, updated history data is written to the user data field 114d11 in the third partition 114d.

Then, the attribute of root directory entry of the third apparatus-specific data 114d14 is returned to read-only (RO) from rewritable (RW), and the attribute of the second partition 114c is returned to read-only (RO) from rewritable (RW) at step S107.

On one hand, if the switching device 115 is not set to ON at step S102 (step S102: NO), a user mode is activated at step S109.

Further, if the SD card check is not OK at step S103 (step S103: NO), the operation unit 140 displays a sign "NG (not good) for SD card check at step S110. The sign NG may be displayed when data such as identification data of SD card cannot be read because of damages of SD card, or when the type of SD card is not supported by an apparatus, for example.

After steps S107, S109, and S110, the process ends when a power source is set to OFF at step S108.

Figure 7:
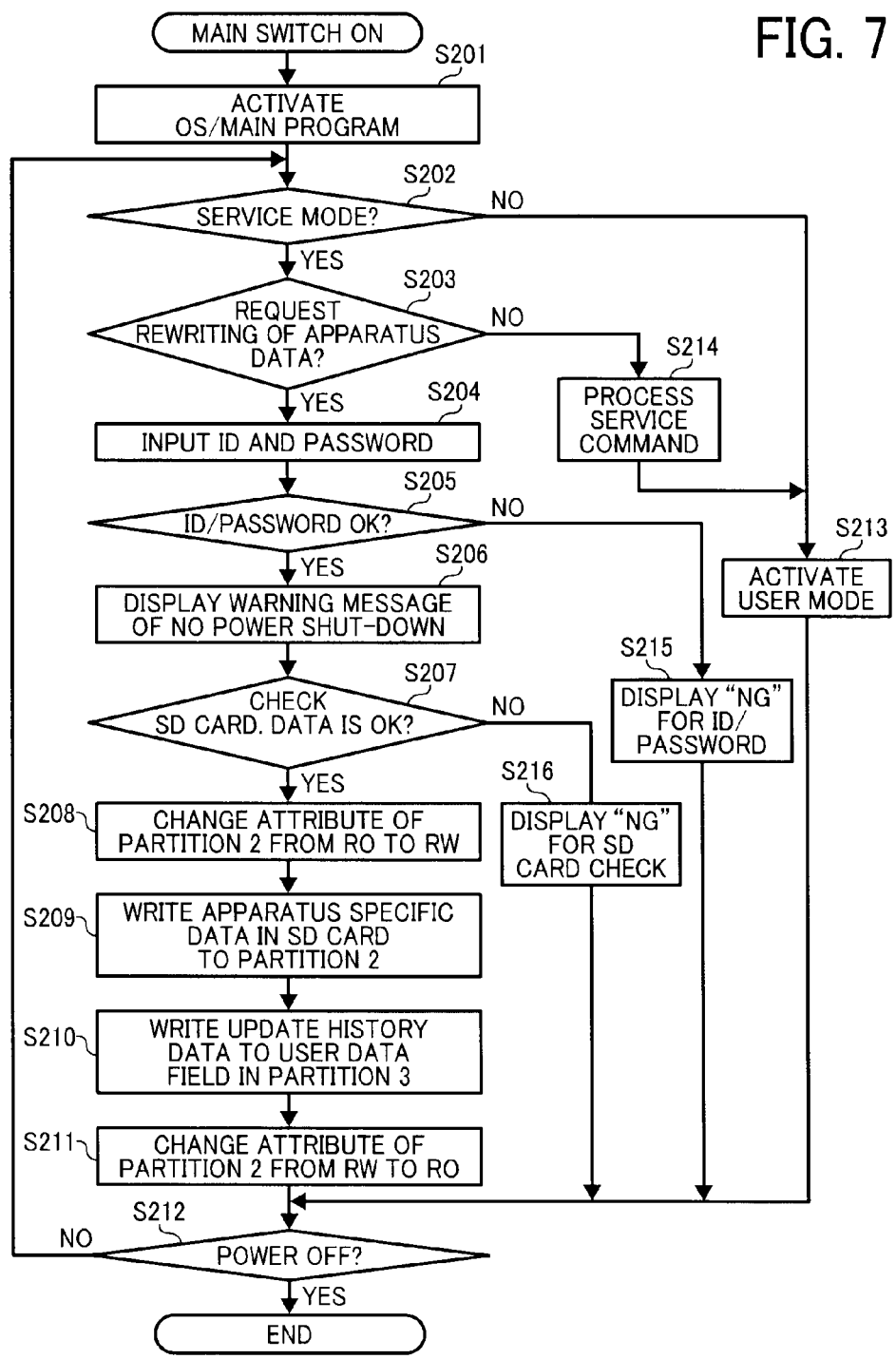
FIG. 7 is a flowchart showing a process of rewriting data by inputting a password from an operation unit and prohibiting data-writing after completing data-writing.

FIG. 7 is a flowchart showing a process for writing apparatus-specific data, required for starting-up a program, at a given location such as at a factory, a user office, or the like. Specifically, a password may be input to a computer system using the operation unit 140 to allow a data writing process. After completing the data writing process for the apparatus-specific data, data-writing prohibited state may be set to the computer system.

As shown in FIG. 7, at step S201, a power source is set to ON, and a main program is activated.

At step S202, it is checked whether a service mode is set. If the service mode is set (step S202: YES), the process goes to step S203. The service mode may be set when a service person sets the service mode using the operation unit 140.

At step S203, it is checked whether a request of rewriting of apparatus-specific data exists. If the request of rewriting of apparatus-specific data is selected by selecting a rewriting menu of apparatus-specific data (step S203: YES), an ID (identification) input screen may be displayed as shown in FIG. 9. The ID input screen may display a SP (system parameter) mode (901), an apparatus data setting menu (902), an apparatus data for apparatus 1 (903) on the operation panel 141, and display input sections 904 and 905 to input "user ID" and "password."

At step S204, a service person inputs a user ID and password, which may be registered in the computer system in advance, to the input sections 904 and 905. Then a given system program checks the validity of the user ID and password.

If the user ID and password is determined as valid (step S205: YES), a warning message 911 is displayed on the operation panel 141 at step S206 as shown in FIG. 10. The warning message 911 may include a message such as "Apparatus data is in writing. Do not shut down power". After displaying the warning message 911, it is checked whether data stored in the SD card 116 corresponds to data of the third apparatus-specific data 114d14 at step S207.

If it is checked that data stored in the SD card 116 corresponds to data of the third apparatus-specific data 114d14 (step S207: Yes), an attribute of the second partition 114c is changed from RO (read-only) to RW (rewritable) at step S208. By changing the attribute of the second partition 114c to RW (rewritable) condition, an attribute of root directory entry of the third apparatus-specific data 114d14 can be changed from RO (read-only) to RW (rewritable).

At step S209, data in the SD card 116 is written to the second partition 114c because data in the SD card 116 corresponds to the third apparatus-specific data 114d14.

At step S210, updated history data 922 is written to the user data field 114d11 in the third partition 114d. As shown in FIG. 11, the updated history data 922 may include information of date 921, user ID 922, updated data 923, and result 924, for example.

Then, the attribute of root directory entry of the third apparatus-specific data 114d14 is returned to read-only (RO) from rewritable (RW), and the attribute of the second partition 114c is returned to read-only (RO) from rewritable (RW) at step S211.

On one hand, if the service mode is not set at step S202 (step S202: No), a user mode is activated at step S213.

Further, if the request of rewriting of apparatus-specific data is not selected at step S203 (step S203: NO), a service command is processed at step S214, and then the user mode is activated at step S213. The service command may include a plurality of menus such as rewriting of apparatus-specific data. If the request of rewriting of apparatus-specific data is not selected at step S203, service mode other than rewriting of apparatus-specific data may be selected.

If the user ID and password is determined as not valid at step S205 (step S205: NO), the operation unit 140 displays NG (not good) for the user ID and password at step S215. Further, if the SD card check is not OK at step S207 (step S207: NO), the operation unit 140 displays a sign "NG (not good) for SD card check at step S216. For example, if the SD card 116 does not store data corresponding to the third apparatus-specific data 114d14, the operation unit 140 displays the sign NG for the SD card 116.

After steps S211, S216, S215, and 213, the process ends when a power source is set to OFF at step 212.

Figure 8:
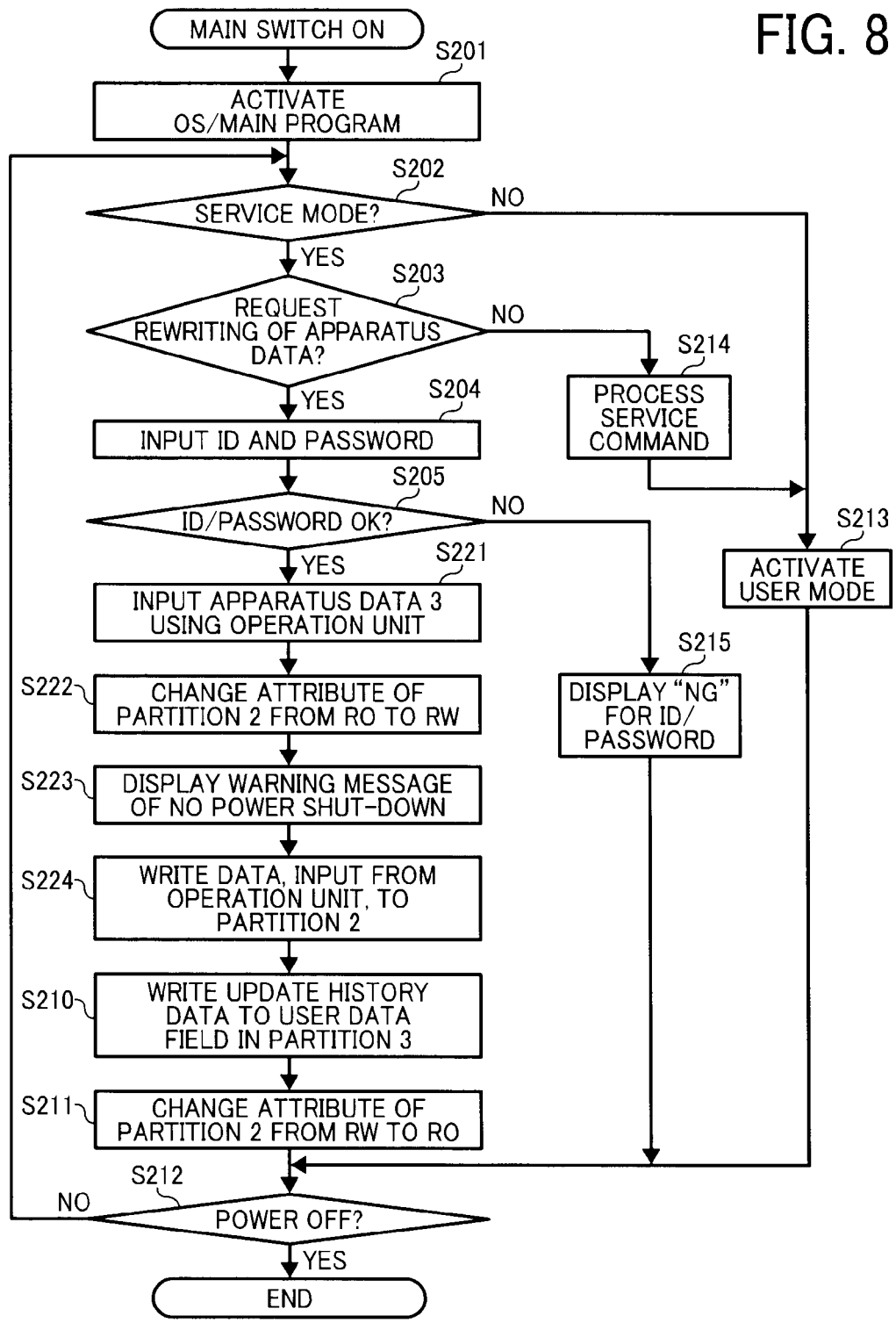
FIG. 8 is a flowchart showing a process of writing data using an operation unit.

A description is now given to a process of writing apparatus-specific data using the operation unit 14. FIG. 8 is a flowchart showing a process of writing apparatus-specific data using the operation unit 140. In the flowchart of FIG. 7, apparatus-specific data is written from the SD card 116, but in the flowchart of FIG. 8, apparatus-specific data is written using the operation unit 140. Accordingly, in the following description for the flowchart of FIG. 8, description of steps similar to the flowchart of FIG. 7 may be omitted.

In FIG. 8, steps S201 (power source is ON and main program is activated) to step S205 (ID/password validity check) are similarly conducted as similar to the flowchart of FIG. 7.

If the user ID and password are determined as valid (step S205: YES), the operation unit 140 displays an input screen used for inputting apparatus-specific data, and a service person inputs data for the third apparatus-specific data 114d14, used as access-restricted data, using the operation panel 141 of the operation unit 140 at step S221.

Then, at step S222, an attribute of the second partition 114c is changed from read-only (RO) to rewritable (RW). By changing the attribute of the second partition 114c to rewritable (RW) condition, an attribute of root directory entry of the third apparatus-specific data 114d14 can be changed from read-only (RO) to rewritable (RW).

At step S223, the operation unit 140 displays the warning message 911 on the operation panel 141, wherein the warning message 911 includes a message of "not to shut down power" as shown in FIG. 10.

At step S224, data input from the operation unit 140 is written to the second partition 114c as the third apparatus-specific data 114d14. Then, steps S210 to S212 are conducted.

Further, although the flash ROM 114 is used as memory in the above-described control processes, the HDD 117 or NVRAM 113 can be used and processed similarly.

In the above described exemplary embodiments, data required for activating or starting-up a system can be stored in the read-only (RO) partition, and such data can be written to the read-only (RO) partition by changing the attribute of read-only (RO) partition to rewritable (RW) condition only during a data writing process. With such a configuration, even when a power shutdown occurs during a data writing process to the rewritable partition, such power shutdown may not affect a system activation or start-up, which means the system can be started up even if the power shutdown occurs during the data writing process.

Further, with the above described configuration, even if a file system in the rewritable partition is corrupted, an apparatus can be started-up or activated. If the apparatus can be activated, a rescue operation such as initializing the rewritable partition can be conducted.

In the above described exemplary embodiments, a data writing process to the read-only partition is allowed by setting the switching device 115 on a main controller to ON (i.e., data writing enabled state), and the read-only partition is protected from data-writing under a normal usage environment by setting the switching device 115 to OFF. Further, in the above described exemplary embodiments, data reliability in the read-only partition can be secured.

In the above-described exemplary embodiments, the switching device 115 may be disposed on a control board (e.g., main controller 110). Accordingly, when to operate and set the switching device 115 to ON condition (i.e., data writing enabled state), hand works such as unscrewing screws from an outer plate of the image forming apparatus may be required. However, if the operation unit 140 can be used as above described, such hand works can be omitted, by which a user can efficiently conduct the above described process, and can conduct maintenance works easily.

In the above described exemplary embodiments, when a password is input from the operation unit 140, a data writing process is allowed for the read-only partition 114c. After completing data-writing to the read-only partition 114c, the attribute of the read-only partition 114c can be returned to the read-only condition automatically. Accordingly, the read-only partition 114c can be protected from unintended or unnecessary data-writing after completing data setting.

In the above described exemplary embodiments, if, by any chance, a power shutdown occurs during a data writing process for the read-only partition 114c, a file system in the partition 114c may be corrupted, and may not be rescued. However, a cause of file system corruption can be investigated using the updated history data 920 including time and user, which can be prepared when the user input a password and data-writing is conducted.

In the above described exemplary embodiments, when data-writing to the read-only partition 114c is temporarily allowed by inputting password or the like, and data is being written, the operation panel 141 displays the warning message 911, which informs an operator or a user not to shut down power supply. With such a configuration, data corruption caused by a power shutdown can be prevented.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A memory management unit for an information processing system, comprising:
   a controller to control data writing; and
   a non-volatile memory used for storing both non-rewritable data and rewritable data required to be read and written at a given timing, the non-volatile memory being managed by a file system and partitioned into a plurality of partitions including a read-only partition and a rewritable partition,
   the read-only partition storing the non-rewritable data including program data to be used when activating the information processing system, and
   the rewritable partition storing the rewritable data including apparatus-specific data, the apparatus-specific data further including access-restricted data required for activating the information processing system, and the access-restricted data is prohibited from being written during normal usage but is writable at specific times,
   wherein the non-rewritable data, stored in the read-only partition, is protected from an abrupt power shutdown occurring when rewritable data is being written, and
   wherein the controller stores the access-restricted data to the read-only partition by changing an attribute of the read-only partition of the non-volatile memory from a read-only attribute to a rewritable attribute.

2. The memory management unit according to claim 1, further comprising a switching device provided on a control board,
   the switching device being switchable between a data-writing prohibited state that sets the read-only attribute for the read-only partition and a data-writing enabled state that sets the rewritable attribute for the read-only partition,
   wherein the access-restricted data is writable to the read-only partition by the controller when the switching device is switched to the data-writing enabled state.

3. The memory management unit according to claim 2, wherein the information processing system includes an operation unit that accepts input of a password, and
   wherein the controller allows data to be written to the access-restricted data when the password is input to the operation unit.

4. The memory management unit according to claim 3, wherein when the password is input from the operation unit, the controller stores password-input history data to the non-volatile memory.

5. The memory management unit according to claim 2, wherein when the access-restricted data, required for activating the program data used for activating the information processing system, is being written, the controller instructs the operation unit to display a message of "do not shut down power".

6. The memory management unit according to claim 1, wherein when writing of the access-restricted data is completed, the controller changes an attribute of the read-only partition from the rewritable attribute to the read-only attribute, and then sets a data-writing prohibited state to the read-only partition.

7. An image forming apparatus comprising the memory management unit according to claim 1,
   wherein the image forming apparatus is incorporated in the information processing system.

8. A memory management method for an information processing system that protects data from an abrupt power shutdown occurring while data is being written in the information processing system, the information processing system including a controller controlling the writing of data for the information processing system and a non-volatile memory storing both non-rewritable data and rewritable data required to be read and written at a given timing,
   the non-volatile memory being managed by a file system and partitioned into a plurality of partitions including a read-only partition and a rewritable partition,
   the read-only partition storing the non-rewritable data including program data to be used when activating the information processing system and the rewritable partition storing the rewritable data including apparatus-specific data, the apparatus-specific data further including access-restricted data required for activating the information processing system, and the access-restricted data is prohibited from being written during normal usage and is writable only at specific times,
   wherein the non-rewritable data, stored in the read-only partition, is protected from the abrupt power shutdown occurring when the rewritable data is being written,
   the method comprising:
   a first switching step of switching an attribute of the read-only partition of the non-volatile memory from a read-only attribute to a rewritable attribute temporarily;
   a storing step of storing the access-restricted data to the read-only partition conditioned to the rewritable attribute; and
   a second switching step of switching an attribute of the read-only partition of the non-volatile memory from the rewritable attribute to the read-only attribute.

9. A computer program comprising computer-readable instructions that, when executed by a computer, instruct a controller to execute a method of protecting data from an abrupt power shutdown occurring while data is being written in an information processing system, the information processing system including a controller controlling the writing of data for the information processing system and a non-volatile memory used for storing both non-rewritable data and rewritable data required to be read and written at a given timing, the non-volatile memory being managed by a file system and partitioned into a plurality of partitions including a read-only partition and a rewritable partition, the read-only partition storing the non-rewritable data including program data to be used when activating the information processing system and the rewritable partition storing the rewritable data including apparatus-specific data, the apparatus-specific data further including access-restricted data required for activating the information processing system, and the access-restricted data is prohibited from being written during normal usage and is writable only at specific times, wherein the non-rewritable data, stored in the read-only partition, is protected from the abrupt power shutdown occurring when the rewritable data is being written, the method comprising:

a first switching step of switching an attribute of the read-only partition of the non-volatile memory from a read-only attribute to a rewritable attribute temporarily;

a storing step of storing the access-restricted data to the read-only partition conditioned to the rewritable attribute; and a second switching step of switching an attribute of the read-only partition of the non-volatile memory from the rewritable attribute to the read-only attribute.

\* \* \* \* \*